Nov. 10, 1931.  J. L. DRAKE  1,831,623
PROCESS AND APPARATUS FOR FORMING SHEET GLASS
Filed Feb. 2, 1928
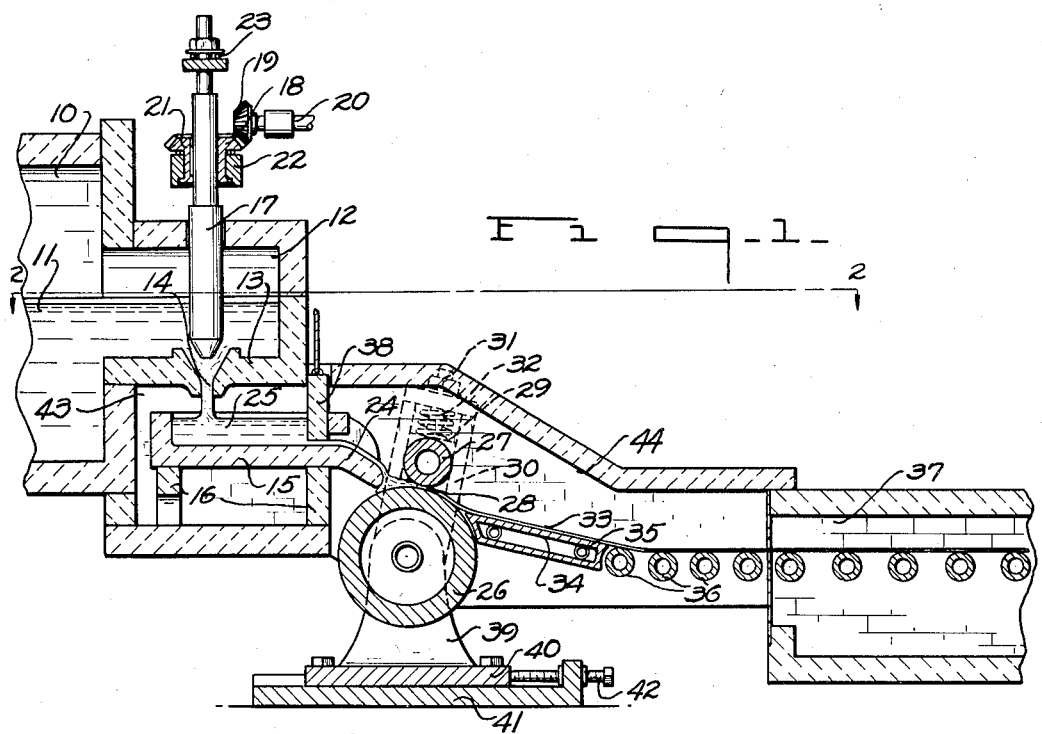
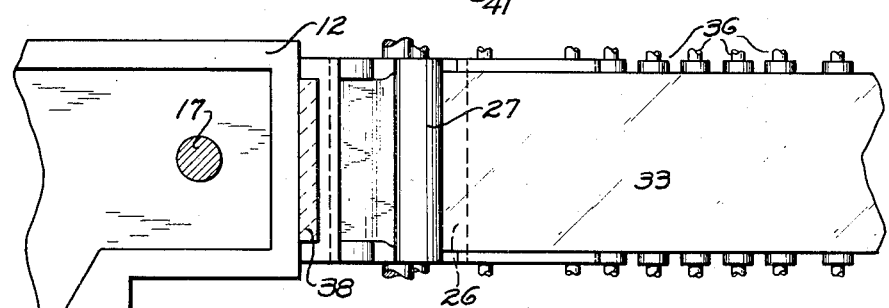
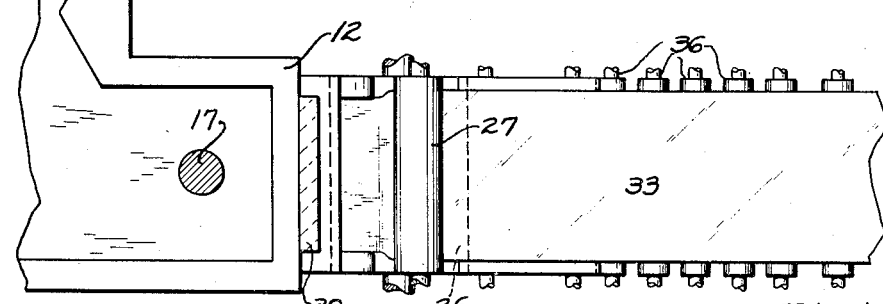
Inventor
John L. Drake
By Frank Fraser
Attorney Patented Nov. 10, 1931

1,831,623

UNITED STATES PATENT OFFICE

JOHN L. DRAKE, OF TOLEDO, OHIO, ASSIGNOR TO LIBBEY-OWENS-FORD GLASS COMPANY, OF TOLEDO, OHIO, A CORPORATION OF OHIO

PROCESS AND APPARATUS FOR FORMING SHEET GLASS

Application filed February 2, 1928. Serial No. 251,289.

This invention relates to a process and apparatus for forming sheet glass.

One of the objects of this invention is to provide means of this character wherein subsurface glass from a mass of molten glass is adapted to be flowed into a container or working receptacle and thence flowed over a refractory member to sheet forming means where it is reduced to a sheet of substantially predetermined dimensions.

Another object of the invention is to provide apparatus of this character wherein the molten glass is first stirred or agitated to a point of homogeneity then flowed to a pot or working receptacle and a controlled amount permitted to flow to sheet forming means whereby the molten glass is reduced to a sheet of predetermined dimensions.

Another object of the invention is to provide apparatus of the nature herein described wherein the working end of the furnace or molten glass containing receptacle is so constructed that a plurality of sheets may be simultaneously formed.

Still another object of the invention is to provide a process and apparatus of the herein described character wherein the molten glass may be flowed from a molten source in a stream and collected in a working receptacle and then flowed in a relatively flat stream of a width substantially equal to the width of the final sheet, to sheet forming means where the molten glass is reduced to final thickness and a sheet of predetermined dimensions produced.

Still another object of the invention is to provide apparatus of this character including sheet forming means between which the molten glass is passed to reduce the same to sheet form together with a stripping slab or member adapted to strip the formed sheet from the forming means and to support the same throughout its surface in a substantially flat condition a sufficient length of time to permit the same to partially set whereupon it may be transferred by supporting and conveying rolls without injury to the surface of the sheet.

Various other objects, advantages and novel details of construction of this invention will be made more apparent as this description proceeds, especially when considered in connection with the accompanying drawings wherein:

Figure 1 is a fragmentary vertical longitudinal sectional view of sheet forming mechanism constructed in accordance with this invention and Figure 2 is a sectional elevational view taken substantially on the plane indicated by line 2—2 in Figure 1.

Referring now to the drawings wherein like reference characters indicate like parts it will be noted that there is fragmentarily illustrated the working end of a tank furnace or molten glass containing receptacle 10 adapted to contain a mass of molten glass 11 which may be prepared therein in any suitable manner or prepared and supplied thereto in any desired or expedient manner. In the present form of the invention the receptacle 10 is provided with a plurality, here shown as two, outlet boots 12 into which the molten glass 11 flows. However, it will be noted that the bottom 13 of each outlet boot 12 is located above the bottom of the mass of molten glass 11 so that sub-surface glass may be flowed from the receptacle 10 by means of the outlet boots 12.

For this purpose the bottom wall of each outlet boot is provided with an outlet opening or spout 14 through which the molten glass flows into a pot or working receptacle 15. This working receptacle may be supported by means of stools or the like 16.

Extending downwardly through the upper wall of each outlet boot 12 is an agitating member 17. While any desired type of agitating means may obviously be employed rotatable plungers are herein illustrated. Each plunger is preferably rotated by means of a bevelled gear 18 with which a bevelled pinion 19 carried by a drive shaft 20 meshes. The bevelled gear 18 is keyed to plunger 17 as indicated at 21 and is supported in a bearing 22. The plunger 17 is reciprocable and may be reciprocated by any suitable means 23 engaging the upper end thereof. By properly adjusting the plunger 17 the flow of molten glass through the outlet opening 14 may obviously be controlled or the plunger be so adjusted as to entirely cut off the flow of molten glass therethrough. The agitator 17 may be continuously rotated in either direction or it may be intermittently rotated or it may be oscillated, as found desirable or expedient. The purpose of the agitator 17 is to stir or mix the mass of molten glass 11 before it flows from the outlet boot 12 so as to reduce the same to a point of substantial homogeneity. It will be noted that with the present construction the single plunger 17 may be satisfactorily and efficiently employed both for agitating the molten glass and controlling the flow thereof through the aperture 14.

The working receptacle 15 is formed with a lip 24 over which the molten glass 25 contained in the receptacle is adapted to flow. The molten glass flowing over the lip 24 is deposited upon a rotatable member or drum 26 which serves as a table to receive the stream of molten glass and co-operating with the drum 26 is a sizing roll 27 which co-operates with the former to create a sheet forming pass 28 through which the molten glass is carried whereby the same is reduced to sheet form.

It will be noted that the molten glass flows from outlet boot 12 into receptacle 15 in a relatively thick stream. This molten glass is collected in the receptacle 15 and is spread laterally and delivered to the sheet forming mechanism in a relatively wide thin stream substantially equal to but preferably slightly less than the width of the sheet which is finally formed. By delivering the molten glass to the sheet forming mechanism in a relatively wide thin stream the rolling of the molten glass to final sheet form is expedited and facilitated.

The sizing roll 27 is preferably journaled in bearing blocks 29 slidable in a frame 30, the bearing blocks 29 and roll 27 being adjustable with reference to drum 26 by means including an adjusting member 31. A spring 32 is interposed between each bearing block 29 and the end of the frame 30 so that the roll 27 may move away from drum 26 in the event foreign matter is carried between the rolls by the molten glass. However, after such foreign matter has passed between the roll and drum the spring 32 will return the roll to its adjusted position. By adjusting roll 27 the width of the sheet forming pass 28 may be varied to thus vary the thickness of the final sheet 33.

Co-operating with the drum 26 is a stripper slab 34 which acts to strip the formed sheet 33 from the drum 26 and to support the same throughout its area in a flattened condition. The temperature of the stripping slab 34 may be controlled in any desired manner as for instance by passing a temperature control medium through the hollow interior thereof by means of conduits 35. The width of the slab 34 in the direction of travel of the sheet 33 is sufficient so that the formed sheet will be supported for a length of time which will permit the same to become partially set before leaving the surface thereof. After the sheet passes from off the slab 34 it is supported by means of supporting and conveying rolls 36 and thence carried into and through an annealing lehr 37. However, by reason of the action of slab 34 the sheet is sufficiently set when it reaches rolls 36 so that contact therewith will not injure the sheet.

The flow of the molten glass 25 from working receptacle 15 onto drum 26 is adjustably controlled by means of a shear cake 38. Obviously the flow of the molten glass may either be completely checked or regulated as desired by means of this shear cake and further by reason of its position with reference to the mass of molten glass the lower strata or subsurface glass only of the mass of molten glass 25 is permitted to flow over lip 24 onto drum 26.

The flowing of the molten glass over lip 24 causes this lip to be worn away and in order to compensate for such wear the sheet forming means including the drum 26 and roll 27 is adjustably supported upon uprights or standards 39 the base portions 40 of which are slidable upon the base plate 41. With such a construction any suitable adjusting means 42 may be provided for sliding the standards 39 with reference to base 41 to thus adjust the sheet forming means with reference to the lip 24, it being possible to accomplish this adjustment without necessitating the stopping of the machine.

The working receptacle 15 is preferably located in a chamber 43 the temperature of which may be controlled in any suitable or desired manner. A chamber 44 encloses the sheet forming means, the stripping slab and the supporting and conveying rolls so that the temperature of the molten glass from the time it flows from the lip 24 onto the sheet forming means until the formed sheet 33 is directed into the lehr 37, may be controlled by properly controlling the temperature of the chamber 44.

As will be obvious from a comparison of Figures 1 and 2 the sheet forming means and associated mechanism just described in detail may be duplicated so that a plurality of sheets may be simultaneously prepared from a single main source of molten glass. It is obvious, however, that the flow of glass from one of the outlet boots 12 may be cut off and but a single sheet produced.

While an embodiment of the invention has been illustrated and described herein somewhat in detail it will be readily apparent to those skilled in this art that various changes, modifications and rearrangements may be resorted to without departing from the spirit and scope of this invention and to this end reservation is made to make such changes as may come within the purview of the accompanying claims.

I claim:

1. In sheet glass forming apparatus, a tank containing a mass of molten glass and having an outlet opening in the bottom thereof, a receptacle positioned beneath said opening for receiving the molten glass from said tank, and sheet forming means positioned at one end of said receptacle for receiving the molten glass substantially horizontally therefrom and reducing it to sheet form.

2. In sheet glass forming apparatus, a tank containing a mass of molten glass and having an outlet opening in the bottom thereof, a receptacle positioned beneath said opening for receiving the molten glass from said tank, said receptacle having an overflow lip at one end thereof, and a pair of sheet forming rolls mounted in opposition to said lip for receiving the molten glass therefrom and rolling it to sheet form.

3. In sheet glass forming apparatus, a tank containing a mass of molten glass and having an outlet opening in the bottom thereof, a receptacle positioned beneath said opening for receiving the molten glass from said tank, said receptacle having an overflow lip at one end thereof, a pair of sheet forming rolls mounted in opposition to said lip for receiving the molten glass therefrom and rolling it to sheet form, means for controlling the flow of molten glass from the tank to the receptacle, and a vertically adjustable gate immersed in the molten glass in the receptacle for causing sub-surface glass only to flow therefrom to the sheet forming means and for also controlling the rate of such flow.

4. In sheet glass forming apparatus, a tank containing a mass of molten glass and having a boot at one end thereof provided with an outlet opening in its bottom, a receptacle positioned beneath said boot for receiving the molten glass therefrom, and sheet forming means positioned at one end of said receptacle for receiving the molten glass substantially horizontally therefrom and reducing it to sheet form.

5. In sheet glass forming apparatus, a tank containing a mass of molten glass and having a boot at one end thereof provided with an outlet opening in its bottom, a receptacle positioned beneath said boot for receiving the molten glass therefrom and having an overflow lip at one end thereof, and a pair of forming rolls arranged in opposition to said lip for receiving the molten glass therefrom and reducing it to sheet form.

6. In sheet glass forming apparatus, a tank containing a mass of molten glass and having a boot at one end thereof provided with an outlet opening in its bottom, a receptacle positioned beneath said boot for receiving the molten glass therefrom and having an overflow lip at one end thereof, a pair of forming rolls arranged in opposition to said lip for receiving the molten glass therefrom and reducing it to sheet form, means for controlling the flow of molten glass from said boot to said receptacle, and a vertically adjustable gate immersed in the molten glass in the receptacle for causing sub-surface glass only to flow therefrom and for also controlling the rate of such flow.

7. In sheet glass forming apparatus, a tank containing a mass of molten glass and being provided adjacent one end with a pair of spaced outlet openings in the bottom thereof, a receptacle positioned beneath each opening for receiving the molten glass from the tank and having an overflow lip at one end thereof, and a pair of forming rolls mounted in opposition to each lip for receiving the molten glass from the corresponding receptacle and reducing it to sheet form.

8. In sheet glass forming apparatus, a tank containing a mass of molten glass and being provided adjacent one end with a pair of spaced outlet openings in the bottom thereof, a receptacle positioned beneath each opening for receiving the molten glass from the tank and having an overflow lip at one end thereof, a pair of forming rolls mounted in opposition to each lip for receiving the molten glass from the corresponding receptacle and reducing it to sheet form, separate means for controlling the flow of molten glass from the tank to each receptacle, and separate means immersed in the molten glass in each receptacle for causing sub-surface glass only to flow therefrom and for also regulating the rate of such flow.

9. In sheet glass forming apparatus, a tank containing a mass of molten glass and having a pair of spaced substantially parallel boots at one end thereof, each boot being provided with an opening in its bottom, a receptacle positioned beneath each boot for receiving the molten glass therefrom and having an overflow lip at one end thereof, and a pair of forming rolls mounted in opposition to each lip for receiving the molten glass from the corresponding receptacle and reducing it to sheet form.

10. In sheet glass forming apparatus, a tank containing a mass of molten glass and having a pair of spaced substantially parallel boots at one end thereof, each boot being provided with an opening in its bottom, a receptacle positioned beneath each boot for receiving the molten glass therefrom and having an overflow lip at one end thereof, a pair of forming rolls mounted in opposition to each lip for receiving the molten glass from the corresponding receptacle and reducing it to sheet form, separate means for controlling the flow of molten glass from each boot to the receptacle positioned therebeneath, and separate means immersed in the molten glass in each receptacle for causing sub-surface glass only to flow therefrom and for also controlling the rate of such flow.

11. In sheet glass forming apparatus, a tank containing a mass of molten glass and being provided adjacent one end with a pair of spaced outlet openings in the bottom thereof, a receptacle positioned beneath each opening for receiving the molten glass from the tank, and a pair of forming rolls mounted at one end of each receptacle for receiving the molten glass therefrom and reducing it to sheet form.

12. In sheet glass forming apparatus, a tank containing a mass of molten glass and having a pair of spaced substantially parallel boots at one end thereof, each boot being provided with an opening in its bottom, a receptacle positioned beneath each boot for receiving the molten glass therefrom, and a pair of forming rolls mounted at one end of each receptacle for receiving the molten glass therefrom and reducing it to sheet form.

Signed at Toledo, in the county of Lucas and State of Ohio, this 30th day of January, 1928.

JOHN L. DRAKE.